US010041593B2

(12) United States Patent
Simpson

(10) Patent No.: US 10,041,593 B2
(45) Date of Patent: Aug. 7, 2018

(54) PISTON RING ASSEMBLY

(71) Applicant: HAMILTON SUNDSTRAND CORPORATION, Windsor Locks, CT (US)

(72) Inventor: Scott W. Simpson, Easthampton, MA (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 0 days.

(21) Appl. No.: 15/180,401

(22) Filed: Jun. 13, 2016

(65) Prior Publication Data

US 2017/0356547 A1   Dec. 14, 2017

(51) Int. Cl.
| F16J 9/06 | (2006.01) |
| F16K 31/122 | (2006.01) |
| F16J 9/12 | (2006.01) |
| F16J 9/26 | (2006.01) |
| F16J 9/16 | (2006.01) |
| F15B 15/14 | (2006.01) |

(52) U.S. Cl.
CPC ............. *F16J 9/06* (2013.01); *F15B 15/1452* (2013.01); *F16J 9/12* (2013.01); *F16J 9/16* (2013.01); *F16J 9/26* (2013.01); *F16K 31/1221* (2013.01)

(58) Field of Classification Search
CPC . F16J 9/00; F16J 9/12; F16J 9/26; F16J 9/14; F16J 9/16; F16J 9/28; F16J 9/06; F16K 31/1221
See application file for complete search history.

(56) References Cited

U.S. PATENT DOCUMENTS

| 1,120,022 | A | * | 12/1914 | Campbell | ................. | F16J 9/16 |
| | | | | | | 277/446 |
| 1,232,140 | A | * | 7/1917 | Westmoreland | ........... | F16J 9/16 |
| | | | | | | 277/446 |
| 1,279,948 | A | * | 9/1918 | Wackenhuth | ............... | F16J 9/16 |
| | | | | | | 277/446 |
| 1,413,031 | A | * | 4/1922 | Kapuczin | .................. | F16J 9/14 |
| | | | | | | 277/446 |

(Continued)

FOREIGN PATENT DOCUMENTS

| FR | 1212468 A | 10/1959 |
| GB | 701981 A | 1/1954 |
| JP | S5885344 A | 5/1983 |

OTHER PUBLICATIONS

European Search Report for European Application No. 17175674.5 dated Nov. 6, 2017, 10 pages.

*Primary Examiner* — Eugene G Byrd
(74) *Attorney, Agent, or Firm* — Cantor Colburn LLP

(57) ABSTRACT

A piston ring assembly includes an inner ring, a first outer ring, and a second outer ring. The inner ring has an outer surface and an inner surface that extends between a first inner ring face and a second inner ring face. The first outer ring has a first outer ring outer surface disposed opposite a first outer ring inner surface, each extends between a first outer ring face and a first outer ring second face. The first outer ring inner surface engages the outer surface. The second outer ring has a second outer ring outer surface disposed opposite a second outer ring inner surface, each extends between a second outer ring first face and a second outer ring second face.

20 Claims, 3 Drawing Sheets

(56) References Cited

U.S. PATENT DOCUMENTS

| | | | | |
|---|---|---|---|---|
| 2,006,365 A | * | 7/1935 | Morton | F16J 9/16 |
| | | | | 277/446 |
| 2,055,153 A | * | 9/1936 | Madsen | F16J 9/14 |
| | | | | 277/486 |
| 2,362,810 A | * | 11/1944 | Farr | F16J 9/00 |
| | | | | 277/440 |
| 2,688,522 A | * | 9/1954 | Hoyt | F16J 9/14 |
| | | | | 277/495 |
| 3,456,954 A | * | 7/1969 | Mayhew | F16J 9/00 |
| | | | | 277/447 |
| 3,481,612 A | | 12/1969 | Sampson et al. | |
| 3,656,766 A | * | 4/1972 | Geffroy | F16J 9/00 |
| | | | | 277/451 |
| 3,806,137 A | * | 4/1974 | Prasse | F16J 9/06 |
| | | | | 277/436 |
| 4,747,602 A | * | 5/1988 | Kobayashi | F16J 9/26 |
| | | | | 277/442 |
| 4,917,391 A | * | 4/1990 | Shelinbarger, Jr. | F16J 9/16 |
| | | | | 277/434 |
| 5,199,722 A | * | 4/1993 | Wada | F02G 1/0535 |
| | | | | 277/434 |
| 5,513,857 A | * | 5/1996 | Watanabe | F02G 1/0535 |
| | | | | 277/469 |
| 6,257,590 B1 | * | 7/2001 | Kumai | F16J 9/062 |
| | | | | 277/435 |
| 2003/0127802 A1 | * | 7/2003 | Bennitt | F16J 9/16 |
| | | | | 277/493 |
| 2013/0305918 A1 | | 11/2013 | Okazaki et al. | |
| 2014/0090554 A1 | * | 4/2014 | Chalk | F16J 9/12 |
| | | | | 92/172 |
| 2015/0143989 A1 | * | 5/2015 | Burmester | F15B 15/068 |
| | | | | 92/33 |

\* cited by examiner

PISTON RING ASSEMBLY

BACKGROUND

Aircraft systems incorporate piston actuated valves. The piston actuated valves incorporate piston rings made of carbon in order to achieve the best leakage performance. The operation of the piston actuated valves within a hot dry pneumatic environment under vibratory loads may cause the carbon piston rings to have a reduced operating life.

BRIEF DESCRIPTION

According to an embodiment of the present disclosure, a piston assembly is provided. The piston assembly includes a piston and a piston ring assembly. The piston has an annular groove that extends about a circumference of the piston. The annular groove has a first face, a second face disposed opposite the first face, and an end face that extends between the first face and the second face. The piston ring assembly is received within the annular groove. The piston ring assembly includes an inner ring, a first outer ring, and a second outer ring. The inner ring has an inner ring body that extends between a first inner ring face and a second inner ring face. The first outer ring is disposed on the inner ring. The first outer ring has a first outer ring body that extends between a first outer ring first face and a first outer ring second face. The second outer ring is disposed on the inner ring and is disposed adjacent to the first outer ring. The second outer ring has a second outer ring body that extends between a second outer ring first face and a second outer ring second face. The second outer ring first face engages the first outer ring second face.

According to another embodiment of the present disclosure, a piston ring assembly is provided. The piston ring assembly includes an inner ring, a first outer ring, and a second outer ring. The inner ring has an outer surface and an inner surface that extends between a first inner ring face and a second inner ring face. The first outer ring has a first outer ring outer surface disposed opposite a first outer ring inner surface, each extends between a first outer ring face and a first outer ring second face. The first outer ring inner surface engages the outer surface. The second outer ring has a second outer ring outer surface disposed opposite a second outer ring inner surface, each extends between a second outer ring first face and a second outer ring second face.

BRIEF DESCRIPTION OF THE DRAWINGS

The subject matter which is regarded as the present disclosure is particularly pointed out and distinctly claimed in the claims at the conclusion of the specification. The foregoing and other features, and advantages of the present disclosure are apparent from the following detailed description taken in conjunction with the accompanying drawings in which:

DETAILED DESCRIPTION

Referring now to the Figures, where the present disclosure will be described with reference to specific embodiments, without limiting same, it is to be understood that the disclosed embodiments are merely illustrative of the present disclosure that may be embodied in various and alternative forms. Various elements of the disclosed embodiments may be combined or omitted to form further embodiments of the present disclosure. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
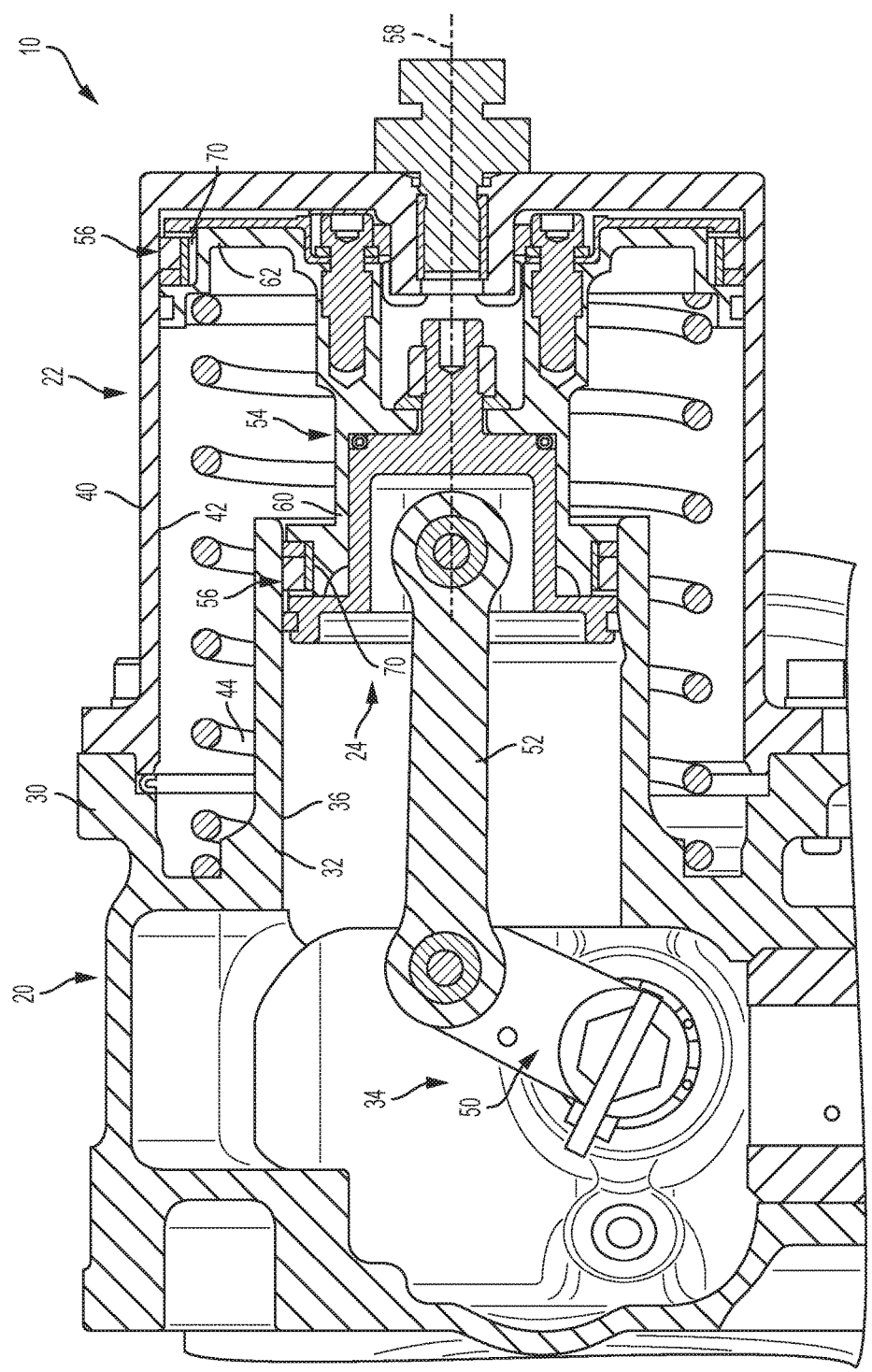
FIG. 1 is a partial cross-sectional view of a valve actuator having a piston assembly.
Figure 2:
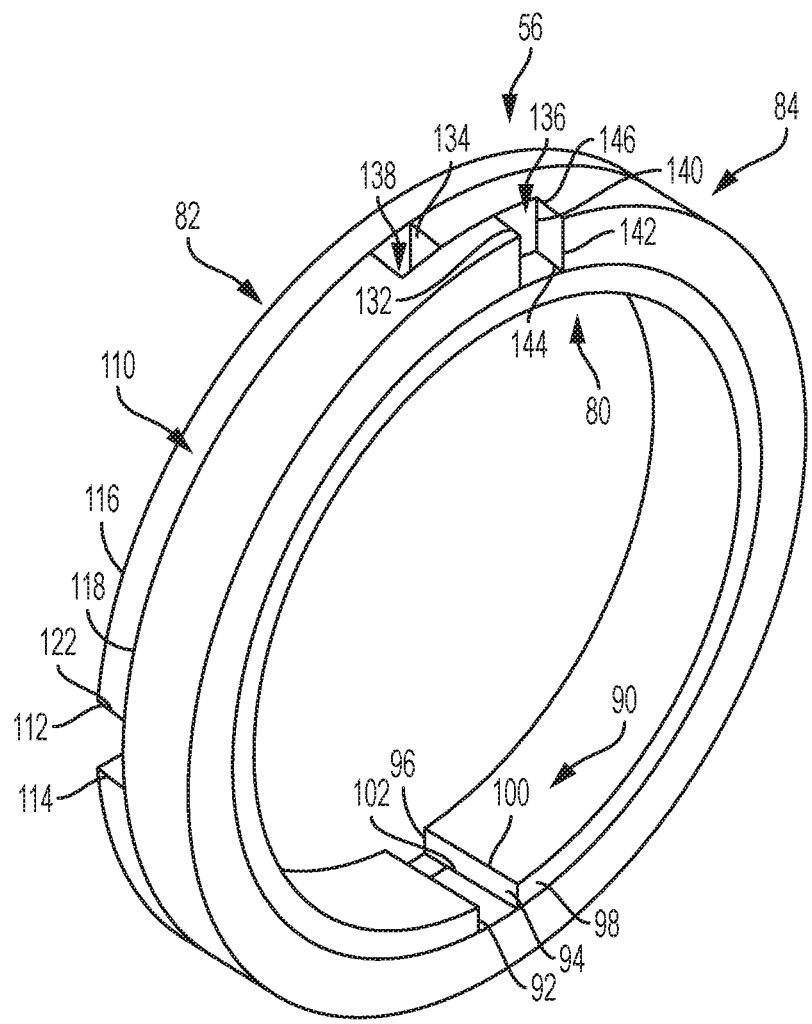
FIG. 2 is a partial cross-sectional view of a piston ring assembly of the piston assembly.

Referring to FIG. 1, a partial cross-sectional view of a valve actuator 10 is shown. The valve actuator 10 may be provided as part of a bleed valve, a pressure relief valve, or the like. The valve actuator 10 selectively opens and closes a valve, which the valve actuator 10 is operatively connected to, to permit or inhibit flow through the valve.

The valve actuator 10 includes a first valve actuator body 20, a second valve actuator body 22, and a piston assembly 24. The first valve actuator body 20 is at least partially received within the second valve actuator body 22. The first valve actuator body 20 includes a first annular wall 30 and a second annular wall 32 disposed substantially concentrically with the first annular wall 30. The first annular wall 30 defines a cavity 34. The second annular wall 32 defines a first piston cylinder having a first piston cylinder bore 36.

The second valve actuator body 22 is disposed on the first valve actuator body 20. The second valve actuator body 22 includes a third annular wall 40. The third annular wall 40 is disposed substantially concentrically with the first annular wall 30 and the second annular wall 32. The third annular wall 40 is connected to the first annular wall 30. The third annular wall 40 defines a second piston cylinder having a second piston cylinder bore 42. The second annular wall 32 is at least partially received within the second piston cylinder bore 42.

In at least one embodiment, a biasing member 44 is provided. The biasing member 44 is a configured as a linear compression spring that engages the first valve actuator body 20 and the piston assembly 24 to bias the piston assembly 24 towards a closed position.

The piston assembly 24 includes a crank assembly 50, a connecting rod 52, a piston 54, and a piston ring assembly 56. The crank assembly 50 is rotatably disposed within the cavity 34. The connecting rod 52 is connected to the crank assembly 50 and the piston 54. The combination of the crank assembly 50 and a connecting rod 52 are configured to move the piston 54 between a first position and a second position along an axis 58. At least one embodiment, the first position corresponds to the closed position of the valve and the second position corresponds to the open position of the valve.

The piston 54 is slidably engaged within the first valve actuator body 20 and the second valve actuator body 22. The piston 54 includes a first portion 60 and a second portion 62. The first portion 60 is slidably received within the first valve actuator body 20. The first portion 60 is slidably engaged with the first piston cylinder bore 36. The first portion 60 has a first diameter.

The second portion 62 is slidably received within the second valve actuator body 22. The second portion 62 is slidably engaged with the second piston cylinder bore 42. The second portion 62 has a second diameter that is greater than the first diameter.

Figure 3:
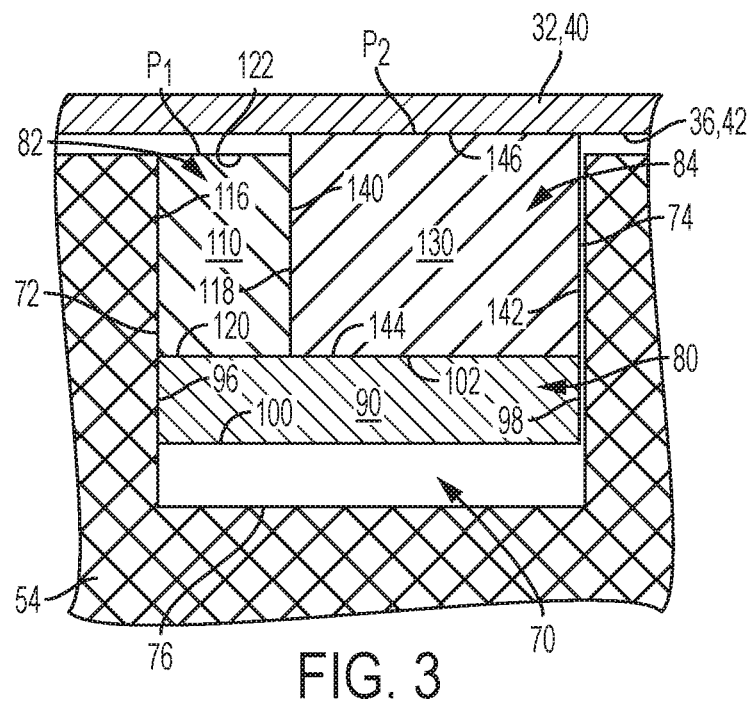
FIG. 3 is a partial cross-sectional view of an embodiment of the piston ring assembly of the piston assembly.
Figure 4:
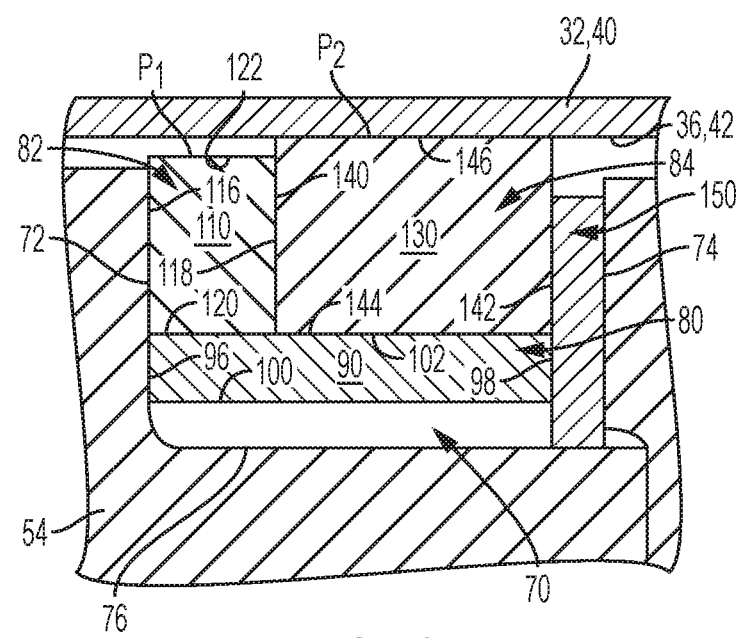
FIG. 4 is a partial cross-sectional view of another embodiment of the piston ring assembly of the piston assembly.

At least one of the first portion 60 and the second portion 62 of the piston 54 defines an annular groove 70. The annular groove 70 extends about a circumference of at least one of the first portion 60 and the second portion 62. Referring to FIGS. 1, 3, and 4 the annular groove 70 has a first face 72, a second face 74, and an end face 76.

The first face 72 is disposed substantially perpendicular to the axis 58. The second face 74 is disposed opposite the first face 72. The second face 74 is disposed substantially perpendicular to the axis 58. The end face 76 extends between the first face 72 and the second face 74. The end face 76 is disposed substantially parallel to the axis 58.

Referring to FIGS. 1-4, the piston ring assembly 56 is received within the annular groove 70. The piston ring assembly 56 includes an inner ring 80, a first outer ring 82, and a second outer ring 84.

The inner ring 80 is made of a metallic material such as X-750 spring steel or S-Monel. The inner ring 80 is configured to expand radially outward. The inner ring 80 includes an inner ring body 90 extending between a first inner ring end 92 and a second inner ring end 94. The first inner ring end 92 is spaced apart from the second inner ring end 94 such that a break is defined between the first inner ring end 92 and the second inner ring end 94.

The inner ring body 90 extends between a first inner ring face 96 and a second inner ring face 98. The first inner ring face 96 is disposed proximate the first face 72 of the annular groove 70 and is configured to engage the first face 72 of the annular groove 70. The second inner ring face 98 is disposed opposite the first inner ring face 96. The second inner ring face 98 is disposed proximate the second face 74 of the annular groove 70. In the embodiment shown in FIG. 3, the second inner ring face 98 is configured to engage the second face 74 of the annular groove 70. In the embodiment shown in FIG. 4, the second inner ring face 98 is spaced apart from the second face 74 of the annular groove 70.

The inner ring body 90 extends between an inner surface 100 and an outer surface 102. The inner surface 100 faces towards the end face 76 of the annular groove 70. The inner surface 100 is spaced apart from the end face 76 of the annular groove 70. The inner surface 100 is disposed substantially parallel to the end face 76 of the annular groove 70.

The first outer ring 82 is disposed on the inner ring 80. The first outer ring 82 is made of a metallic material such as S-Monel. The metallic material is provided with good wear characteristics and low friction characteristics. The wear potential due to vibration between the first outer ring 82 and the piston 54 is high and the metallic material must be selected to withstand such relative motion between the first outer ring 82 and the piston 54. The first outer ring 82 is configured to contract radially inward. The first outer ring 82 includes a first outer ring body 110 extending between a first outer ring first end 112 and a first outer ring second end 114. The first outer ring first end 112 is spaced apart from the first outer ring second end 114 such that a break is defined between the first outer ring first end 112 and the first outer ring second end 114.

The first outer ring body 110 extends between a first outer ring first face 116 and a first outer ring second face 118. The first outer ring first face 116 is disposed proximate the first face 72 of the annular groove 70. The first outer ring first face 116 is configured to engage the first face 72 of the annular groove 70. The first outer ring first face 116 is disposed substantially parallel to the first inner ring face 96.

The first outer ring body 110 extends between a first outer ring inner surface 120 and the first outer ring outer surface 122. The first outer ring inner surface 120 engages the outer surface 102 of the inner ring 80. The first outer ring outer surface 122 faces towards at least one of the first piston cylinder bore 36 and the second piston cylinder bore 42. The first outer ring outer surface 122 is spaced apart from at least one of the first piston cylinder bore 36 and the second piston cylinder bore 42. The first outer ring outer surface 122 is completely disposed within a first plane, $P_1$.

The second outer ring 84 is disposed on the inner ring 80 and is disposed adjacent to the first outer ring 82. The second outer ring 84 is made of a carbon material such as carbon graphite. The second outer ring 84 is a sliding ring and the carbon material is provided with good low friction characteristics. The second outer ring 84 includes a second outer ring body 130 extending between a second outer ring first end 132 and a second outer ring second end 134. The second outer ring first end 132 overlaps the second outer ring second end 134. A first notch 136 is defined between the second outer ring first end 132 and the second outer ring body 130. A second notch 138 is defined between the second outer ring second end 134 and the second outer ring body 130. The second notch 138 is disposed adjacent to the first outer ring 82.

The second outer ring body 130 extends between a second outer ring first face 140 and a second outer ring second face 142. The second outer ring first face 140 is disposed adjacent to and abuts the first outer ring second face 118. The second outer ring second face 142 is disposed opposite the second outer ring first face 140. The second outer ring second face 142 is disposed proximate the second face 74 of the annular groove 70. In the embodiment shown in FIG. 3, the second outer ring second face 142 is configured to engage the second face 74 of the annular groove 70. In the embodiment shown in FIG. 4, the second outer ring second face 142 is spaced apart from the second face 74 of the annular groove 70.

The second outer ring body 130 extends between a second outer ring inner surface 144 and a second outer ring outer surface 146. The second outer ring inner surface 144 engages the outer surface 102 of the inner ring 80. The second outer ring outer surface 146 faces towards at least one of the first piston cylinder bore 36 and the second piston cylinder bore 42. The second outer ring outer surface 146 is configured to slidably engage at least one of the first piston cylinder bore 36 and the second piston cylinder bore 42. The second outer ring outer surface 146 is biased towards engagement with at least one of the first piston cylinder bore 36 and the second piston cylinder bore 42 by the inner ring 80.

The second outer ring outer surface 146 is completely disposed within a second plane, $P_2$. The first plane, $P_1$, is disposed parallel to but not coplanar with the second plane, $P_2$.

Referring to FIG. 4, a biasing member 150 may be provided. The biasing member 150 may be a spring washer, a wave washer, or the like. The biasing member 150 is disposed between the second face 74 of the annular groove 70, the second inner ring face 98, and the second outer ring second face 142. The biasing member 150 biases the first inner ring face 96 and the first outer ring first face 116 towards engagement with the first face 72 of the annular groove 70.

During operation of the valve actuator 10, the configuration of the piston ring assembly 24 ensures that the second outer ring 84 does not wear prematurely. The piston ring assembly 24 provides a wear resistance low leak seal with an enhanced life as compared to a typical carbon seal and enhanced sealing properties as compared to a typical metallic seal. The improved wear resistance and sealing properties provide increased reliability in high temperature pneumatic bleed valves.

The piston ring assembly 56 may be assembled to the piston assembly 24 by providing the inner ring 80. The inner ring 80 is expanded to be installed into the annular groove 70. The inner ring 80 has a free diameter that is greater than the installed diameter of the inner ring 80. The inner ring 80 applies an outward force that is directed away from the end face 76 of the annular groove 70 towards at least one of the first piston cylinder bore 36 and the second piston cylinder bore 42.

The first outer ring 82 is provided. The first outer ring 82 is expanded and placed around the inner ring 80. The first outer ring 82 applies an inward force that is directed towards the end face 76 of the annular groove 70 and away from at least one of the first piston cylinder bore 36 and the second piston cylinder bore 42.

The second outer ring 84 is provided. The second outer ring 84 is compressed and placed around the inner ring 80 and is disposed adjacent to the first outer ring 82. The second outer ring 84 applies an outward force that is directed away from the end face 76 of the annular groove 70 towards at least one of the first piston cylinder bore 36 and the second piston cylinder bore 42.

The outward force of the inner ring 80 is greater than the inward force of the first outer ring 82 to inhibit or eliminate leakage between the inner ring 80 and the first outer ring 82 and the second outer ring 84.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

The invention claimed is:

1. A piston assembly, comprising:
a piston having a first portion that is slidably engaged within a first piston cylinder bore defined by a second annular wall that is disposed concentrically with a first annular wall of a first valve actuator body and a second portion that is slidably engaged with a second piston cylinder bore defined by a third annular wall that is disposed concentrically with the second annular wall of a second valve actuator body disposed on the first valve actuator, the first portion having an annular groove extending about a circumference of the piston, the annular groove having a first face, a second face disposed opposite the first face, and an end face extending between the first face and the second face;
a biasing member disposed about the second annular wall and engages the first valve actuator body and the second portion of the piston; and
a piston ring assembly received within the annular groove, the piston ring assembly comprising:
an inner ring having an inner ring body extending between a first inner ring face and a second inner ring face;
a first outer ring disposed on the inner ring, the first outer ring having a first outer ring body extending between a first outer ring first face and a first outer ring second face; and
a second outer ring disposed on the inner ring and disposed adjacent to the first outer ring, the second outer ring having a second outer ring body extending between a second outer ring first face and a second outer ring second face, the second outer ring first face engages the first outer ring second face.

2. The piston assembly of claim 1, wherein the first outer ring body has a first outer ring outer surface that is spaced apart from the first cylinder bore of a cylinder that slidably receives the piston ring assembly.

3. The piston assembly of claim 2, wherein the second outer ring body has a second outer ring outer surface engages the first cylinder bore.

4. The piston assembly of claim 1, wherein the first inner ring face engages the first face.

5. The piston assembly of claim 4, wherein the second inner ring face is spaced apart from the second face.

6. The piston assembly of claim 1, wherein the first outer ring first face engages the first face.

7. The piston assembly of claim 6, wherein the second outer ring second face is spaced apart from the second face.

8. The piston assembly of claim 7, wherein the piston ring assembly further comprises a biasing member disposed between the second face and the second outer ring second face and the second inner ring face, the biasing member engages the end face and is spaced apart from the first cylinder bore.

9. The piston assembly of claim 8, wherein the biasing member biases the first outer ring first face and the first inner ring face towards engagement with the first face.

10. The piston assembly of claim 1, wherein the inner ring body defines an inner surface and an outer surface disposed opposite the inner surface.

11. The piston assembly of claim 10, wherein the inner surface is spaced apart from the end face.

12. A piston ring assembly, comprising:
an inner ring having an outer surface and an inner surface extending between a first inner ring face and a second inner ring face, the first inner ring face engaging a first face of an annular groove, the second inner ring face spaced apart from a second face of the annular groove disposed opposite the first, and the inner surface spaced apart from an end face of the annular groove that extends between the first face and the second face by a gap;
a first outer ring having a first outer ring outer surface disposed opposite a first outer ring inner surface, each extending between a first outer ring first face and a first outer ring second face, the first outer ring outer surface engages the first face and the first outer ring inner surface engages the outer surface;
a second outer ring having a second outer ring outer surface disposed opposite a second outer ring inner surface, each extending between a second outer ring first face and a second outer ring second face; and
a biasing member that engages the second face, the second outer ring second face, the second inner ring face, and the end face the biasing member being spaced apart from a cylinder bore.

13. The piston ring assembly of claim 12, wherein the first outer ring second face engages the second outer ring first face.

14. The piston ring assembly of claim 12, wherein the second outer ring outer surface is configured to slidably engage the cylinder bore.

15. The piston ring assembly of claim 14, wherein the first outer ring outer surface is spaced apart from the cylinder bore.

16. The piston ring assembly of claim 15, wherein the first outer ring outer surface is completely disposed in a first plane and the second outer ring outer surface is completely disposed in a second plane.

17. The piston ring assembly of claim 16, wherein the first plane is disposed parallel to but not coplanar with the second plane.

18. The piston ring assembly of claim 12, wherein the first outer ring is made of a metallic material.

19. The piston ring assembly of claim 18, wherein the second outer ring is made of a carbon material.

20. The piston ring assembly of claim 19, wherein the inner ring is made of a metallic material.

* * * * *